(12) United States Patent
Al-Zahrani et al.

(10) Patent No.: US 9,028,964 B2
(45) Date of Patent: May 12, 2015

(54) ACTIVATED NANO CARBON AND NANO COMPOSITE CONTAINING ACTIVATED NANO CARBON, AS WELL AS METHODS FOR THEIR PREPARATION

(75) Inventors: Saeed Mohammed Al-Zahrani, Riyadh (SA); Ateeq Rahman, Riyadh (SA); Ilias Ali, Riyadh (SA); Rabeh H. Elliethy, Riyadh (SA)

(73) Assignee: King Saud University, Riyadh (SA)

( * ) Notice: Subject to any disclaimer, the term of this patent is extended or adjusted under 35 U.S.C. 154(b) by 299 days.

(21) Appl. No.: 13/616,372

(22) Filed: Sep. 14, 2012

(65) Prior Publication Data

US 2013/0089738 A1 Apr. 11, 2013

(30) Foreign Application Priority Data

Oct. 11, 2011 (EP) .................................. 11184615

(51) Int. Cl.
| | | |
|---|---|---|
| *B02C 19/18* | (2006.01) | |
| *B02C 23/08* | (2006.01) | |
| *B02C 23/18* | (2006.01) | |
| *B02C 17/00* | (2006.01) | |
| *C01B 31/14* | (2006.01) | |
| *B82Y 30/00* | (2011.01) | |
| *C01B 31/10* | (2006.01) | |
| *C01B 31/12* | (2006.01) | |

(52) U.S. Cl.
CPC ............ *C01B 31/10* (2013.01); *Y10T 428/2982* (2015.01); *C01B 31/12* (2013.01); *C01B 31/14* (2013.01); *C01P 2004/64* (2013.01); *B82Y 30/00* (2013.01); *Y10S 977/795* (2013.01)

(58) Field of Classification Search
USPC ............ 428/402, 403, 323; 427/212; 977/795
IPC . B02C 19/18,23/08, 23/18, 17/00; C01B 31/14; B32B 5/16
See application file for complete search history.

(56) References Cited

U.S. PATENT DOCUMENTS

| | | | |
|---|---|---|---|
| 7,240,865 B2 * | 7/2007 | Choi ........................ | 241/46.014 |
| 2008/0254972 A1 * | 10/2008 | Istvan et al. ................... | 502/182 |

FOREIGN PATENT DOCUMENTS

CN 101891188 11/2010

OTHER PUBLICATIONS

N.M. Haimour et al.; "Utilization of date stones for production of activated carbon using phosphoric acid"; Waste Management 26 (2006); p. 651-660.
Shengjuan et al.; "Optimization of nanostructures of activated carbon by mechanical methods" Advanced Materials Research vols. 148-149 (2011); pp. 1277-1280.
XP-002671772; WPI Abstract for CN101891188.
Zhang et al.; "Three-dimensional nanocarbon and the electrochemistry of nanocarbon/tin oxide for lithium ion batteries"; J Solid State Electrochem (2011) 15:2645-2652.

* cited by examiner

*Primary Examiner* — Leszek Kiliman
(74) *Attorney, Agent, or Firm* — Renner, Otto, Boisselle & Sklar, LLP

(57) ABSTRACT

The present invention relates to a method for preparing activated nano carbon from food waste material and a method for preparing a polymer nano composite, wherein the activated nano carbon at least one polymer are blended.

17 Claims, 6 Drawing Sheets

ACTIVATED NANO CARBON AND NANO COMPOSITE CONTAINING ACTIVATED NANO CARBON, AS WELL AS METHODS FOR THEIR PREPARATION

The present application claims priority under 35 U.S.C. §119(a) to European Application No. 1118415.0, filed 11 Oct. 2011, the entirety of which is hereby incorporated herein by reference.

The present invention relates to a method for preparing activated nano carbon from a food waste material, a method for preparing a nano polymer composite containing the activated nano carbon, as well as the activated nano carbon and nano polymer composite prepared.

In recent years nano carbon materials, like carbon nano tubes or fullerene, have quicken interest of scientists from academia as well as from industry due to the numerous potential applications in fields of nano electronics, photovoltaic devices, superconductors, electrochemical capacitors, sensors and nano composites. At present there are three common methods used for the preparation of nano carbon arc-discharge under inert gas atmosphere, laser ablation and chemical vapor deposition. These methods are highly energy consuming and require complex vacuum equipment. Because of the increased shifting from laboratory scale preparation to industrial production of nano carbon raising energy costs and a limited availability of starting material will be the challenges to be solved in this field. A simple approach to fabricate graphitic carbon nano capsules, tungsten carbide and tungsten carbide/graphitic carbon composites by using the renewable biopolymer chitosan as carbon source was proposed.

Activated carbon is widely industrially used due to its excellent adsorption capability. This characteristic can be attributed to its porosity and high specific surface area. The feasibility to use several low cost adsorbants from agricultural and industrial waste was explored. In general, activated carbon can be prepared by pyrolysis of lignocellulosic materials like wood, peach and olive stones, coconut, almond or pecan shells and other agricultural by products.

In comparison, date pits have received much less consideration as a source for the preparation of activated carbon. The world annual production of dates was about 3.4 million tons in 1990. Since the date pits represent about 10% of the date's weight, their utilization as a substrate for the preparation of activated carbon retrieves high economical potential.

N. M. Haimour et. al. *Waste Management*, 2006, 26, 651-660 discloses a method for preparing activated carbon from date pits by activation with phosphoric acid and subsequent thermal treatment. The activated carbon prepared this way exhibits particles sizes in a range from 0.4 to 1.2 mm.

B. S. Girgis et. al. *Microporous and Mesoporous Materials*, 2002, 52, 105-107 also discloses the preparation of activated carbon from date pits by activation with phosphoric acid and subsequent pyrolysis. Particle sizes from 0.5 to 2.0 mm are obtained.

Recently, polymer nano composites are in the limelight as new interesting materials because of the unique properties synergistically derived from their nano scale structure. These materials can exhibit enhanced physical, mechanical, thermal, electrical, magnetic or optical properties compared to the respective neat polymers. These benefits can already be achieved by mixing small amounts of nano material with the polymer. A wide range of reinforcing agents, such as calcium carbonate, mica, glass fiber, silica, clay or carbon nanotubes were used for the preparation of polymer nano composites.

It is an object of the present invention to provide a method for the preparation of activated nano carbon which overcomes the drawbacks of the prior art. Especially a method shall be provided permitting an easy and cheap access to activated carbon featuring particle sizes below 100 nm suitable for use in the preparation of polymer nano composites.

Further a method for preparing a polymer nano composite shall be provided, wherein the nano carbon is used to enhance the polymer material properties.

Finally, it is a further object to provide respective activated nano carbon and polymer nano composite.

The first object is achieved by a method for preparing activated nano carbon from food waste material comprising the steps:
 (a) crushing the food waste material and sieving through up to 500 microns sieve to obtain a food waste material powder;
 (b) impregnating the food waste material powder with an impregnation agent;
 (c) activating the impregnated food waste material powder obtained in step (b) in the presence of an activating gas at a temperature of 500 to 800° C.;
 (d) cryo-grinding of the activated food waste material powder obtained in step (c) to result in activated nano carbon having a particle size of 10-100 nanometer.

In a most preferred embodiment, the food waste material is date pits, coconut shells, almond shells, olive stones and/or pecan shells, preferably date pits.

Preferably, the food waste material is washed with deionized water and substantially dried before step (a).

Even preferred, the impregnating agent is at least one acid and/or base.

More preferred, the impregnating agent is sulfuric acid, phosphoric acid, caustic potassium or zinc chloride.

In one embodiment, the activation gas is carbon dioxide, helium, oxygen, argon, and/or nitrogen.

Preferably, the activation gas is carbon dioxide.

In one embodiment, activating is carried out in a tubular reactor.

The reactor used in the present invention is preferably a tubular reactor placed vertically inside a heating furnace. The length and the diameter are fixed in order to achieve uniform heat flow inside the column. There are different gas inlets distributed equally on the tubular reactor side wall in order to flow the activation gas uniformly into the food waste powder to achieve high quality activated nano carbon.

The tubular reactor does not have in the method of the present invention to be operated under high pressure. Preferably, activating is carried out under normal pressure.

In one embodiment, cryo-grinding is carried in a ball mill in a temperature range from 0 to −100° C., preferably −20 to −50° C.

In one embodiment the activated powder obtained in step (c) is washed with 0.1 N diluted HCl and water until the pH is substantially neutral, and/or chloride ions are substantially removed, prior to step (d).

Preferably, the duration of the activation in step (c) is in a range from 1 to 5 h, preferably 2 to 5 h.

Even preferred, after impregnating the food waste material powder is washed several times with deionized water until the pH is substantially neutral.

The second object is achieved by a method for preparing a nano polymer composite, wherein the activated nano carbon prepared according to this invention and at least one polymer are blended.

In one embodiment the polymer is a polyolefin, a polycarbonate, a polyester and/or an epoxy resin, preferably high density polyethylene (HDPE).

In one embodiment, the blending is carried out by melt blending.

Surprisingly, it was found that activated nano carbon can be prepared from food waste material after crushing and sieving, impregnating with an impregnating agent and activating by pyrolysis in the presence of an activation gas by diligent mechanical grinding at low temperatures using a ball mill, so called cryogenic grinding or cryo-grinding. Thus, the method provides a cheap and easy pathway to achieve nano carbon material as well as activated carbon with a high specific surface from wood waste material. By example, huge amounts of zero cost date seeds are thrown away each year especially in Saudi Arabia. Therefore, the method of the present invention can be utilized to manufacture nano carbon in an inexpensive way and to prepare polymer composites from this material.

Also, the inventors of the present application have surprisingly found that the nano carbon prepared according to the present invention can be successfully used to produce polymer nano composites with enhanced material properties as increased tensile strength or dynamic moduli compared to the neat polymer.

Nano carbon in terms of the present invention means carbon materials exhibiting diameter in a range from 10-100 nm.

It is obvious that all washing steps using water or watery solutions include a subsequent drying step which is accomplished at a temperature from 100-120° C. In the same way the use of other solvents than water is conceivable.

Besides acids and bases other agents exhibiting a dehydrating effect are conceivable as impregnating agents.

The preparation of polymer nano composites is not limited to the utilization of a polyolefin as polymer component. Other polymers are conceivable.

The activated nano carbon prepared according to the present invention features a uniform particle size distribution.

In step (a) of the method for preparing activated nanocarbon the maximum mesh size which shall be used is 500 microns. A lower mesh size will yield activated nano carbon of higher quality but will lower the amount of product.

The cryo-grinding step combines the benefits of cryogenic temperatures and the conventional mechanical milling process. The extremely low grinding temperature suppresses recovery and recrystallization and leads to finer grain structures and more rapid grain refinement. It is also less energy consuming and the size of the grinded particles is to control. Ball size, rotational grinding speed, ball to powder ratio (by weight) and the temperature are important parameters by controlling the particle size and particle size distribution.

Preferably, a temperature of the cryo-grinding step is from −50° C. to −20° C.

Additional features and advantages of the present invention will become apparent in the following detailed description on the basis of Examples with reference to the drawing, wherein FIG. 1 shows a SEM image of activated carbon prepared according to Example 1.

EXAMPLE 1

Date pits were washed with deionized water to remove darts and impurities and afterwards dried at 100° C. in an oven overnight to facilitate subsequent crushing and grinding. The obtained date pit powder was sieved through a 500 microns sieve.

The sieved date pit powder was impregnated by exposing to sulfuric acid. The resulting slurry was left at room temperature overnight. After filtering, the residue was washed several times with deionized water till pH was neutral and afterwards dried at 120° C. in an oven overnight.

The impregnated date pit powder was activated in a tubular reactor at 700° C. under carbon dioxide atmosphere for 3h. Afterwards the activated date pit powder was washed with 0.1 N dil. HCl and several times with deionized water till pH was neutral and substantially all chloride ions were removed. The suspension was decanted and the activated date pit powder dried at 110° C. in an oven overnight. Activated carbon was achieved in a yield of 25.5 wt.-% related to the weight of date pits.

The preparation was repeated several times using different activation times and temperatures as shown in Table 1. This variations cause slight changes in yields of activated carbon.

TABLE 1

Yields of activated carbon from date pits at different conditions

| No | Activating agent | Temperature of activation | Time of activation (h) | Yield % |
|---|---|---|---|---|
| 1. | $H_2SO_4$ | 700° | 1 | 26.25 |
| 2. | $H_2SO_4$ | 700° | 3 | 25.5 |
| 3. | $H_2SO_4$ | 600° | 1 | 20.5 |
| 4. | $H_2SO_4$ | 600° | 3 | 23.8 |

Figure 1:
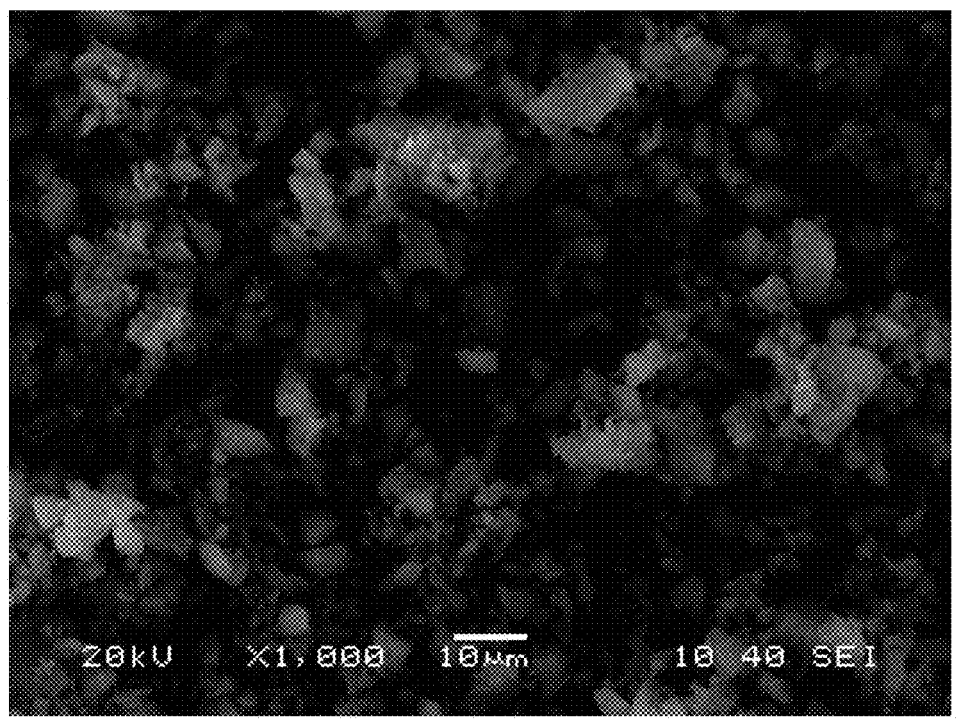

The SEM image (FIG. 1) of activated carbon exhibits an amorphous structure with particle diameters from 1-10 μm.

EXAMPLE 2

The activated carbon prepared according to Example 1 was cryo-grinded for 100 h in a temperature range from −20° C. to −50° C. in a planetary ball mill Fritsch Pulverisette 6 with tools made of zirconia. The activated carbon was ground in a vial with milling balls featuring diameters of 10 and 15 mm. The ball to powder ratio was 20:1 in weight and the milling intensity was 250 rpm. Activated nano carbon featuring particular sizes in a range from 10-100 nm was obtained this way.

Elemental analysis of the activated nano carbon was performed using LECO CHNS-932 equipment by sample combustion in oxygen excess.

TABLE 2

Elemental analysis of the cryo-grinded activated nano carbon sample

| Sample | C (%) | H (%) | N (%) |
|---|---|---|---|
| Nano Carbon | 75.32 | 3.75 | 1.64 |

The remaining approximately 20% are partially oxidized components of date stones.

The basic components of date stones are given in table 3.

TABLE 3

Components of date stones:

| Components | % |
|---|---|
| Ash | 1-2 |
| Moisture | 5-10 |
| Oil | 7-10 |
| Crude fiber | 10-20 |
| Carbohydrate | 55-65 |
| Protein | 5-7 |

Figure 2:
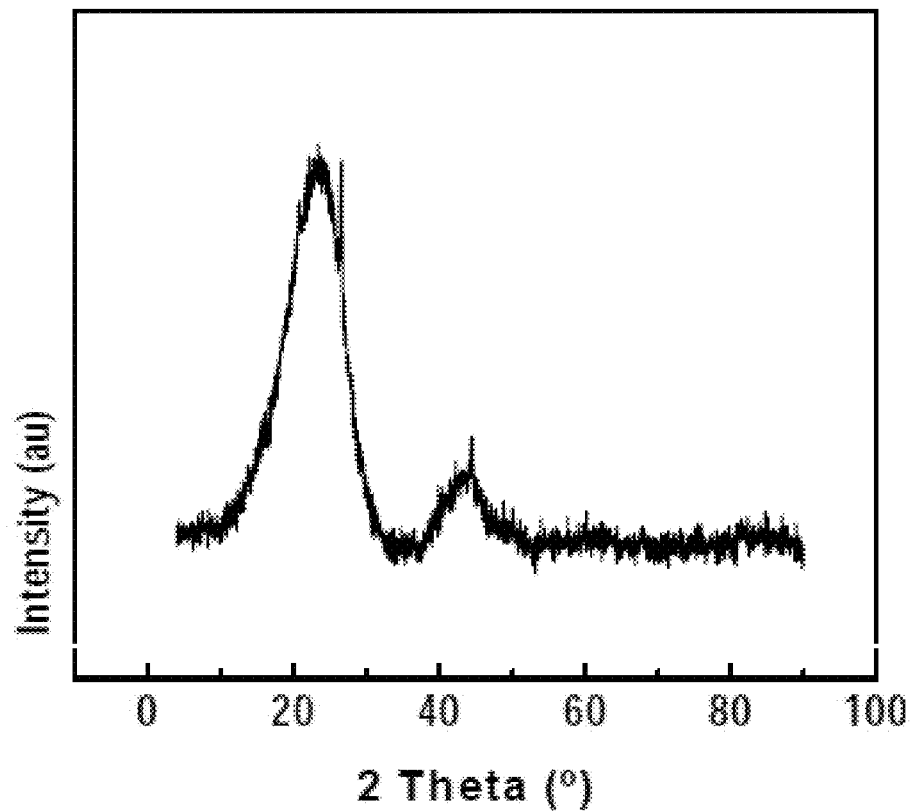
FIG. 2 shows a wide-angle X-ray diffraction pattern of activated nano carbon prepared according to Example 2.

The activated nano carbon was characterized by powder X-ray diffractometry according to the step-scanning procedure (step size 0.04°; 20 s) with a computerized Seifert 3000 diffractometer, using Ni-filtered $CuK_\alpha$ ($\lambda=0.15406$ nm) radiation and a PW 2200 Bragg-Brentano θ/2θ goniometer equipped with a bent graphite monochromator and an automatic slit. The assignment of the various crystalline phases was based on the JPDS powder diffraction file cards. The powder X-ray diffraction profiles are displayed in FIG. 2. They show two broad diffraction lines characteristic for amorphous carbons. In an attempt to identify the presence of graphite-like structures these profiles were compared with that of the JCPDS data bases. This comparison revealed that a minor proportion of graphite structures is present in both samples (card 01-075-1621).

Figure 3:
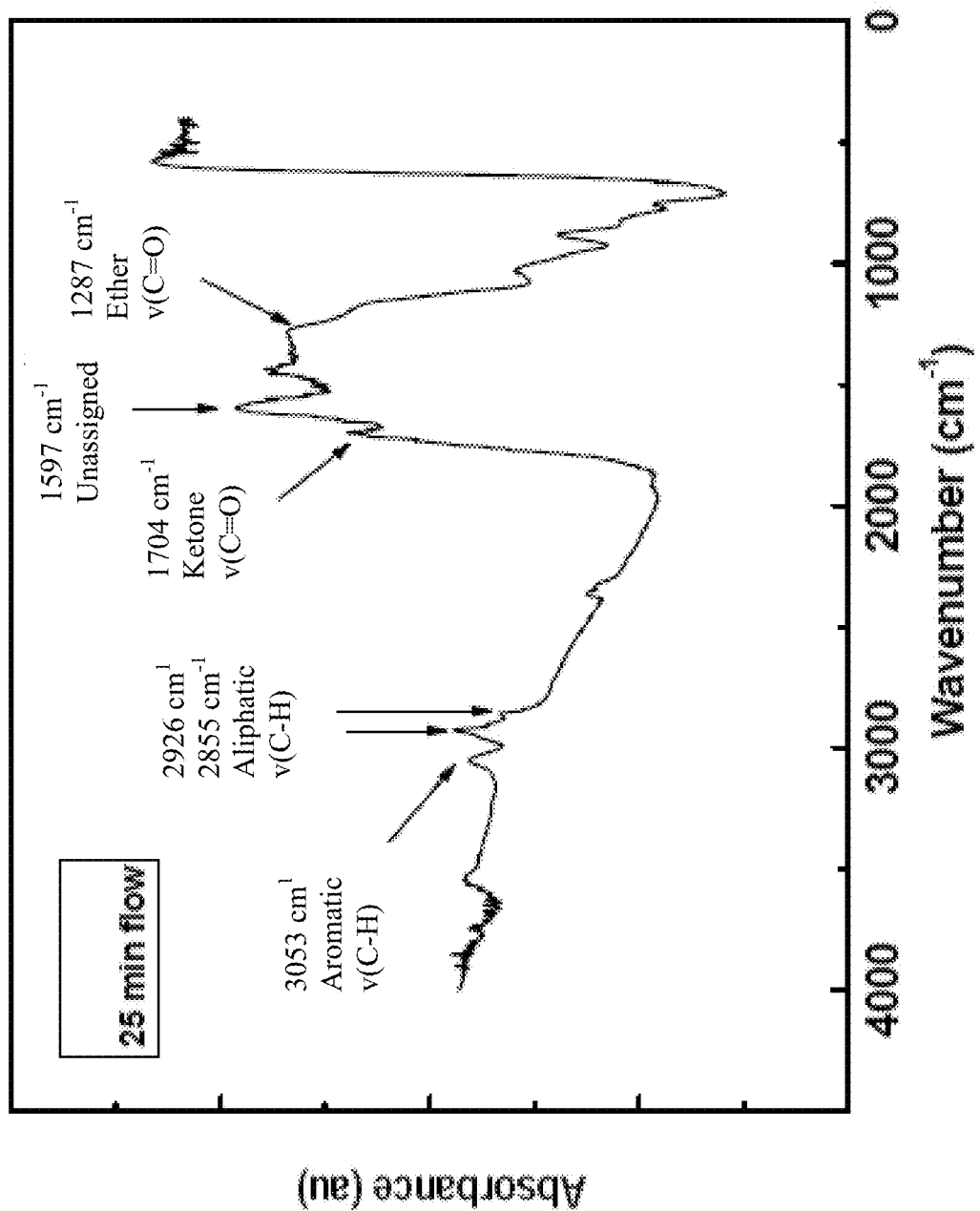
FIG. 3 shows an infrared spectrum of activated nano carbon prepared according to Example 2 collected after degassing at 400° C. for 30 min and exposing 25 min to He flow.

The infrared spectra of activated nano carbon were recorded after degassing at 400° C. under He flow for times between 1 and 25 min. The infrared spectra of activated nano carbon, previously degassed and then exposed to He flow for 25 min, are shown in FIG. 3. In the C—H stretching region, it exhibit the infrared modes for both aromatic (about 3060 $cm^{-1}$) and aliphatic (2926 and 2863 $cm^{-1}$) groups. A C=O stretching mode can be seen at 1704 cm-1, assigned to ketone groups. Alternate assignments are dismissed due to the absence of aldehyde C—H stretching modes near 2820 $cm^{-1}$, as well as the absence of O—H intensity, which would indicate carboxylic acids.

Figure 4:
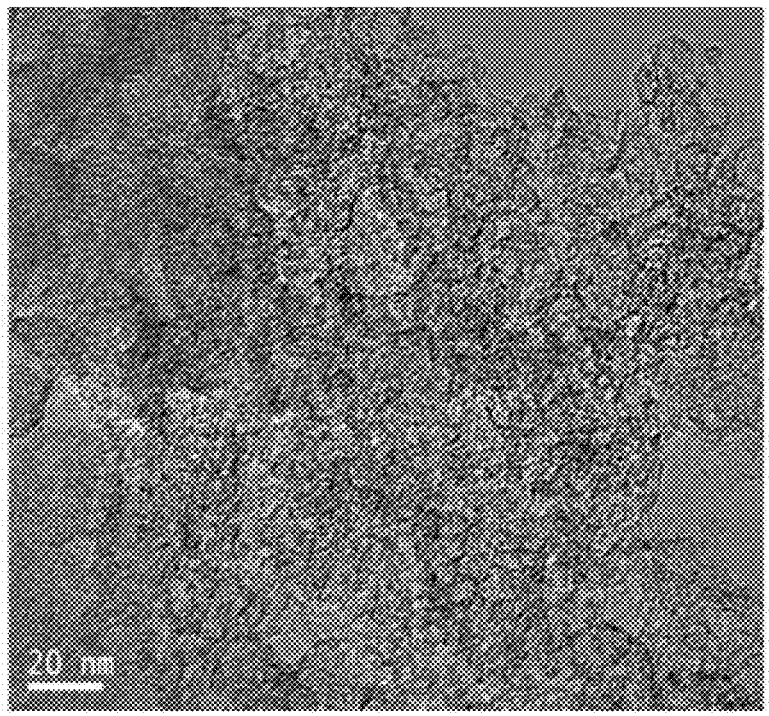
FIG. 4 shows a TEM image of activated nano carbon prepared according to Example 2.

Photoelectron spectra of the activated nano carbon was recorded on a VG Escalab 200R electron spectrometer equipped with a hemispherical electron analyzer, using a $MgK_\alpha$, (hv=1253.6 eV) X-ray source. After degassing at $10^{-6}$ mbar, the samples were transferred to the ion-pumped analysis chamber, in which the residual pressure was kept below $4\times10^{-9}$ mbar during data acquisition. The binding energy (BE) of the C1s peak at 284.9 eV was taken as an internal standard. The accuracy of the BE values was ±0.1 eV. Peak intensities were estimated by calculating the integral of each peak after subtracting an S-shaped background and fitting the experimental peak to a combination of Lorentzian/Gaussian lines of variable proportions. Atomic surface contents were estimated from the areas of the peaks, corrected using the corresponding sensitivity factors. This analysis shows only C1s and O1s peaks together with corresponding Auger lines. The C1s peak was satisfactorily deconvoluted in three components at 284.9, 286.2 and 288.2 eV, which are assigned to C—C, C—O and COO groups, respectively. The O1s of both samples was deconvoluted in two components at 531.3 and 533.5 eV, which are usually assigned to C=O and C—O bonds, respectively. These binding energy values and the corresponding O/C surface atomic ratios are compiled in Table 3. FIG. 4 shows the TEM image of the cryo-grinded carbon prepared as described in Example 2

TABLE 3

Binding energies (eV) of core-levels and O/C surface atomic ratios of activated nano carbon sample

| Sample | C1s | O1s | O/C at |
|---|---|---|---|
| Cryo-grinded sample | 284.9 (59) | 531.5 (38) | 0.167 |
|  | 286.2 (31) | 533.3 (62) |  |
|  | 288.2 (10) |  |  |

The particle size of the nano carbon obtained is in the range of 10-100 nm.

EXAMPLE 3

A high density polyethylene (HDPE); melt index of 30 g/10 min, density of 0.954 $g/cm^3$ and tensile strength at yield of 1200 MPa) was used for the preparation of polymer nano composite together with the activated nano carbon prepared according to Example 2. An injection molding machine (Asian Plastic Machinery Co., Double Toggle IM Machine, Super Master Series SM 120) was used to mold ASTM standard samples.

TABLE 4

List of the polymer nano composite samples prepared

| Sample name | HDPE-54 % | % of cryo-grinded carbon | % of cryo-grinded carbon |
|---|---|---|---|
| CB-0 | 100 | 0 | 0 |
| CB-1 | 98 | 2 | 0 |
| CB-2 | 98 | 0 | 2 |

Sample CB-1 relates to a composite prepared by utilizing the nano carbon of the present invention. For sample CB-2 nano carbon from a commercial source was used.

As summarized in Table 5 different injection molding conditions were utilized.

TABLE 5

Details of injection molding condition
Injection molding conditions

| Temperature profile (° C.) | | | | Cool time (sec) | Water circulation temperature (° C.) |
|---|---|---|---|---|---|
| Die Zone | Zone III | Zone II | Feed Zone | | |
| 210 | 230 | 220 | 160 | 15 | 10-11 |

The temperature of the cooling water was 10-11° C. The molded specimens were conditioned at 23° C. for 24 h before further adjusting.

TABLE 6

Summary of the tensile results (±5% error).

| Sample Name | Tensile strength, MPa |
| --- | --- |
| CB-0 | 19.9 |
| CB-1 | 22.53 |
| CB-2 | 22.52 |

Figure 5:
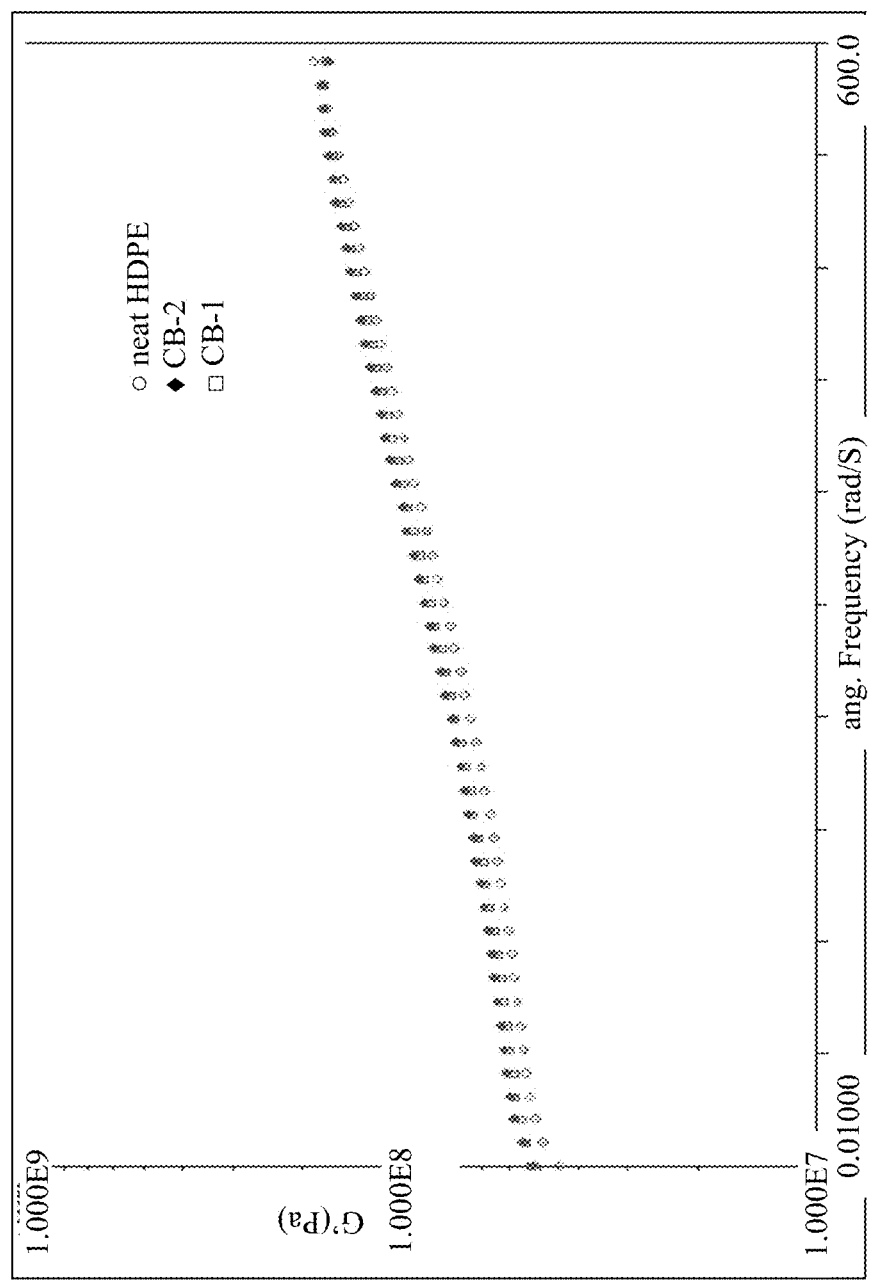
FIG. 5 shows dynamic modulus curves of neat HDPE and HDPE nano composites prepared according to Example 3.

FIG. 5 illustrates the dynamic modulus curves of neat HDPE and HDPE nano composites prepared according to Example 3.

Figure 6:
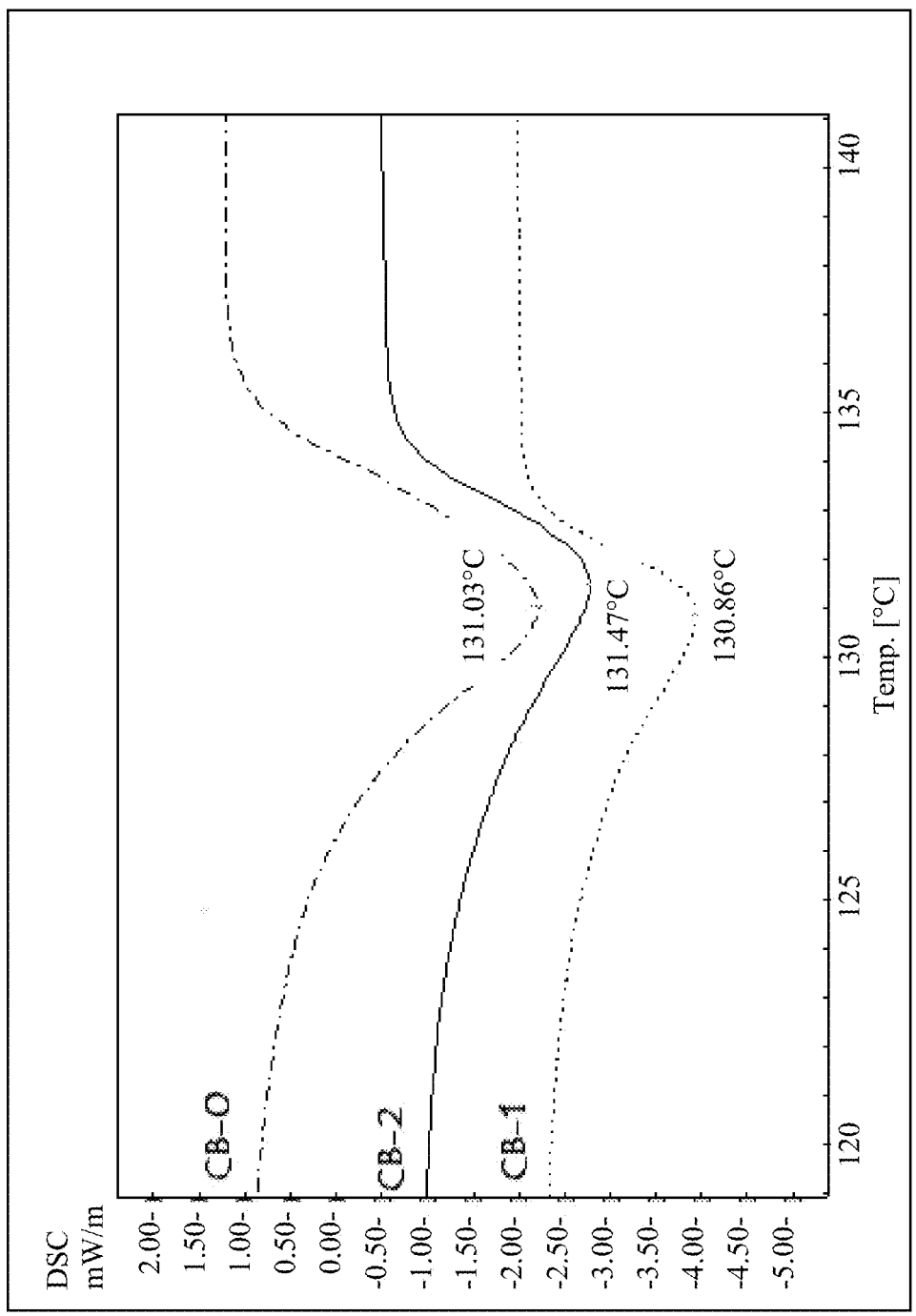
FIG. 6 shows DSC thermograms of neat HDPE (CB-0) and HDPE nano composites prepared according to Example 3 (heating scans).

FIG. 6 shows DSC thermograms of neat HDPE (CB-0) and HDPE nano composites (CB-1 and CB-2) prepared according to Example 3.

Figure 7:
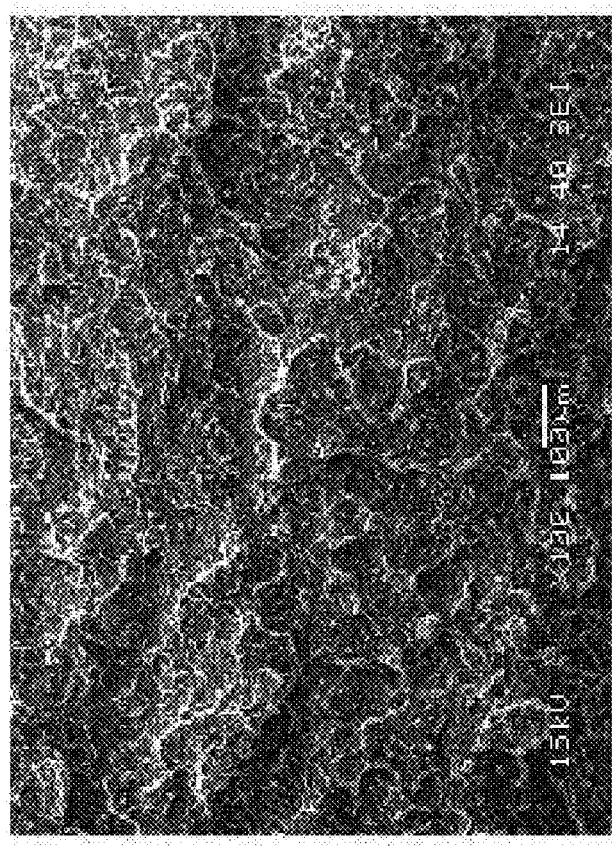
FIG. 7 shows SEM images of tensile fractured samples of the HDPE nano composite prepared according to Example 3 showing the dispersion of the activated nano carbon in the polymer matrix.
Figure 7:
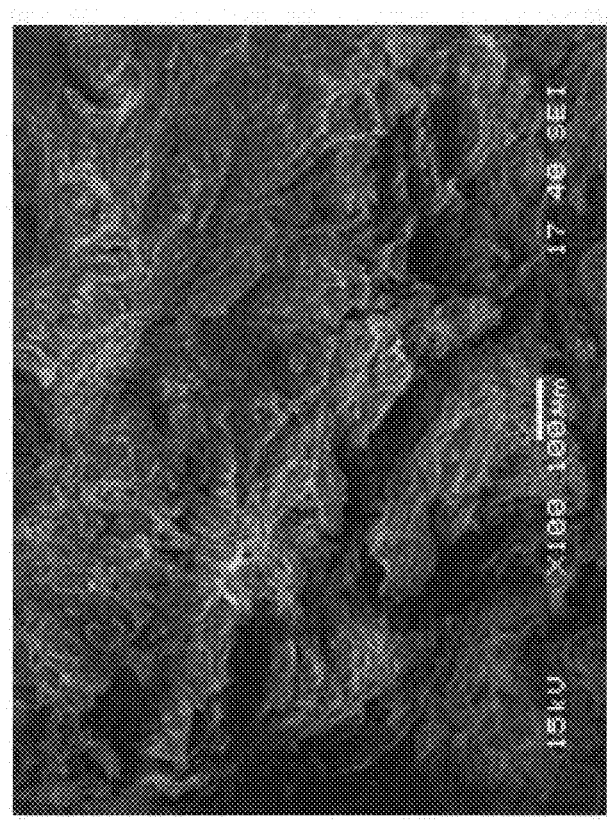

Finally, FIG. 7 shows SEM images of tensile fractured samples of the HDPE nano composite prepared according to Example 3 showing the dispersion of the activated nano carbon in the polymer matrix.

The features disclosed in the foregoing description, the claims and the drawings may, both separately and in any combination thereof, be material for realising the invention in diverse forms thereof.

The invention claimed is:

1. Method for preparing activated nano carbon from food waste material comprising the steps:
   (a) crushing the food waste material and sieving through up to 500 microns sieve to obtain a food waste material powder;
   (b) impregnating the food waste material powder with an impregnation agent;
   (c) activating the impregnated food waste material powder obtained in step (b) in the presence of an activating gas at a temperature of 500 to 800° C.;
   (d) cryo-grinding of the activated food waste material powder obtained in step (c) to result in activated nanocarbon having a particle size of 10-100 nanometer.

2. Method according to claim 1, wherein the food waste material is date pits, coconut shells, almond shells, olive stones and/or pecan shells.

3. Method according to claim 1, wherein the food waste material is washed with deionized water and dried substantially before step (a).

4. Method according to claim 1, wherein the impregnating agent is at least one acid and/or base.

5. Method according to claim 1, wherein the activation gas is carbon dioxide, helium, oxygen, argon, and/or nitrogen.

6. Method according to claim 1, wherein activating is carried out in a tubular reactor under normal pressure.

7. Method according to claim 1, wherein cryo-grinding is carried out in a ball mill in a temperature range from −100° C. to 0° C.

8. Method according to claim 1, wherein the activated powder obtained in step (c) is washed with 0.1 N diluted HCl and water until the pH is substantially neutral and/or the chloride ions are substantially removed prior to step (d).

9. Method according to claim 1, wherein duration of the activation in step (c) is in a range from 1 to 5 h.

10. Method according to claim 1, wherein after impregnating the food waste material powder is washed several times with deionized water until the pH is substantially neutral.

11. Method for preparing a nano polymer composite, wherein the activated nano carbon prepared according to claim 1 and at least one polymer are blended.

12. Method for preparing a polymer nano composite according to claim 11, wherein the polymer is a polyolefin, a polycarbonate, a polyester and/or an epoxy resin.

13. Method for preparing a polymer nano composite according to claim 11, wherein the blending is carried out by melt blending, and preferably the amount of nano carbon is less than 5% by weight with regard to the amount of polymer.

14. Activated nano carbon, prepared according to claim 1.

15. Nano polymer composite, prepared according to claim 1.

16. Method according to claim 1, wherein the impregnating agent is sulfuric acid, phosphoric acid, caustic potassium or zinc chloride.

17. Method according to claim 11, wherein the polymer is high density polyethylene (HDPE).

* * * * *